3,383,305
NITROGEN REMOVAL WITH COBALT-MOLYBDE-NUM-MANGANESE-ALUMINA CATALYST
Edward S. Rogers, Hinsdale, Ill., and Stephen M. Kovach, Highland, Ind., assignors to Sinclair Research, Inc., New York, N.Y., a corporation of Delaware
No Drawing. Filed Sept. 20, 1965, Ser. No. 488,719
5 Claims. (Cl. 208—254)

ABSTRACT OF THE DISCLOSURE

Process for hydrotreating nitrogen-containing mineral hydrocarbons by contacting said hydrocarbons with molecular hydrogen under hydrogenation conditions in the presence of a catalyst including cobalt, molybdenum, and manganese on an alumina support.

---

This invention relates to the catalytic processing of mineral hydrocarbons which in many cases contain impurities, and particularly relates to an alumina supported cobalt, molybdenum and manganese hydrocarbon conversion catalyst especially suited for the hydrogen treatment of hydrocarbon stocks. This catalyst shows unusually high activity for denitrogenation, desulfurization and hydrogenation of olefins, aromatics, etc. of feeds such as petroleum, coal tar or shale oil hydrocarbon fractions.

The presence of sulfur and nitrogen in mineral hydrocarbon oils has long been recognized as undesirable. Nitrogen compounds have a poisoning effect as they often tend to reduce or destroy the activity of catalysts employed to convert, e.g. crack, these stocks. The higher the nitrogen content of the charge stock, the higher will be the temperature required to effect a given amount of conversion which eventually requires more frequent regeneration or earlier replacement of the catalyst. Sulfur compounds are highly objectionable in hydrocarbon oils as they have an unpleasant odor, tend to cause corrosion and often lead to sludging. These difficulties have led to various proposals for desulfurization and denitrogenation of almost all petroleum, coal tar and shale oil hydrocarbon fractions which are normally liquid or which can be made fluid at treating temperatures, including light distillates, middle and heavy distillates and even residual stocks. For instance, prior methods have included acid-treatment, deasphalting and hydrogenolysis in contact with catalytic material such as molybdenum sulfide, tungsten oxide, nickel sulfide, tungsten sulfide, cobalt molybdate, cobalt tungstate, etc. Hydrogen treatment of the feed-stocks has become widely accepted, but as yet available catalysts have not been found to effect denitrogenation with the same high activities as exhibited for hydrogenation and desulfurization. Typical commercial hydrodesulfurization catalysts are comprised of an alumina base having deposited thereon cobalt and molybdenum components, e.g. cobalt molybdate. These are good catalysts for hydrogenation and desulfurization of petroleum fractions, but are only fair for nitrogen removal. As high-nitrogen feedstocks find increasing use in petroleum refining, this lack becomes more keenly felt.

It is an object of this invention to devise a method for upgrading these mineral oils through the removal of sulfur and nitrogen contaminants and the hydrogenation of olefins, aromatics, etc. therein, in an efficient manner. Another object is to devise a hydrodesulfurization catalyst which will effect high rates of hydrogenation and denitrogenation in the mineral hydrocarbon feedstocks.

These and other objects of the present invention are attained by the hydrogen treatment of the hydrocarbon feed in the presence of a catalyst consisting essentially of minor, catalytic amounts of cobalt, molybdenum and manganese components on an alumina support. We have discovered that this catalyst has significantly greater activity for both hydrogenation and denitrogenation of hydrocarbon fractions than have catalysts consisting only of cobalt and molybdenum components on alumina or those consisting only of manganese on alumina. This is an unexpected finding inasmuch as manganese on alumina alone is essentially inert for both these reactions and manganese addition to other related hydrogenation catalysts such as nickel oxide-molybdena-alumina either has no effect or actually causes a decrease in catalyst activity.

The catalysts of this invention preferably contain the cobalt, molybdenum and manganese either in their oxide forms, for instance as mixtures of cobaltous oxide, molybdena and manganese oxide or as mixed manganese and cobalt molybdates, or in their sulfide forms or mixtures of both. Calcination conditions can provide the various oxide forms; the sulfides are prepared, for example, by deposition of the metals as their sulfides on the support or by a sulfiding treatment subsequent to calcination, as will be more fully explained later. In accordance with the present invention the catalyst composition often contains about 1 to 6% by weight of cobalt, calculated as metal, preferably about 2 to 4%, about 8 to 20% by wight of molybdenum, calculated as molybdenum trioxide ($MoO_3$), preferably about 12 to 15%, and about 1 to 30% by weight of manganese, calculated as manganese oxide ($MnO$-$Mn_2O_3$), preferably about 2.5 to 6%.

Various methods can be used to prepare the alumina-supported catalyst of this invention. In the impregnation of the alumina substrate the cobalt, molybdenum and manganese may be in the oxide form or as compounds or salts which will be converted to the oxide form upon calcination. For example, the manganese can be combined with the alumina substrate by impregnation or coprecipitation prior to impregnation with cobalt or molybdenum, or the manganese can be added at the same time as the cobalt and molybdenum either in a solution of soluble salts or by hydrothermal digestion, where substantially water-insoluble salts, e.g. the oxides, hydroxides or carbonates, of cobalt and manganese are boiled in water with molybdenum trioxide in the presence of the alumina base, probably forming mixed manganese and cobalt molybdates on the alumina surface. Preferably the metal components will be in intimate association on the alumina carrier; addition of manganese to an already completed cobalt-molybdenum on alumina catalyst, therefore, is not preferred for the preparation of the catalyst in its most active form. The catalysts of this invention may be formed into convenient shapes by conventional methods, such as by pelleting of extrusion.

The alumina base from which the catalyst is prepared can be any of the known hydrates or an activated or calcined hydrogel. Hydrates such as the monohydrate, boehmite; the trihydrates, bayerite I (nordstrandite) and gibbsite; or another hydrous alumina which appears to be amorphous, and preferably the hydrates which contain a major portion or consist essentially of boehmite may be employed. Calcination converts these hydrates to an activated or gamma family type alumina, e.g. gamma, delta, eta, chi, etc., depending on the composition of the hydrate and choice of calcination conditions. The alumina hydrate can be prepared by any of the conventional methods; for example, an aqueous solution of aluminum chloride or other acidic aluminum salt can be reacted with aqueous ammonium hydroxide to precipitate an essentially boehmite or amorphous alumina hydrate. This material can be washed to remove chloride and ammonium ions.

When combined with the promoting metals the alumina can be activated or a hydrate in the form of dried or undried alumina hydrate or alumina hydrogel in gelatinous form dried sufficiently to afford discrete particles. Finely divided particles, e.g. passing about 100 or even 200 mesh (Tyler) for the most part, such as spray dried microspheres are preferred. Such alumina supports are usually characterized by a large surface area ranging from about 60 to 600 or more square meters per gram, preferably greater than about 200 square meters per gram as determined by the BET method. They may also have a relatively large content of pore volume in the pore size range of about 20 to 100 Angstrom units, of the order of greater than 0.3, preferably greater than 0.6, cc. per gram of pore volume in pores of this size, although mechanical steps of forming the catalyst into pellets, as by tabletting or extruding, may affect the amount of pore volume of this size. Typical alumina based catalysts made from boehmite alumina may have essentially no pores greater than about 50 Angstrom units in size and have pore distributions which are similar to those of silica-alumina. On the other hand, the catalysts made from aluminas containing high percentages of the crystalline trihydrates in the precursor alumina mixtures have considerable pore volume in the 100 to 1000 Angstrom units pore size range. These large pores do not occur in many alumina bases derived from the boehmite or monohydrate form of precursor alumina, either before or after calcination. The boehmite type of precursor alumina is often characterized by crystallite size of the order of 40 Angstrom units before and after calcination and contains no pores larger than 50 Angstrom units. In the impregnation of the alumina substrate the cobalt, molybdenum and manganese may be in the oxide form or as compounds or salts which will be converted to the oxide form upon calcination.

Calcination or activation of the metal-promoted product is conventional and may be conducted at temperatures of about 700 to 1400° F., or more, preferably from 900 to 1100° F., in an atmosphere of hydrogen, nitrogen, free oxygen-containing gas, such as air, or other gas for a length of time sufficient to convert substantially all of the metal to the oxide form or otherwise provide an active catalyst.

The catalysts of this invention are particularly active when the promoting metals in the oxide form are converted to the sulfides. The sulfiding step may be effected by passing hydrogen sulfide, either pure or diluted with another gas such as, for instance, hydrogen, over a bed of the metal-activated alumina catalyst, which is in the oxide form as obtained from the calcination step, at temperatures usually from about 300 to 850° F., preferably from 500 to 750° F., for a time sufficient to convert a significant portion tof the catalytic metal oxides to their respective sulfides. Alternatively, the catalyst may be sulfided by the processing of a sulfur-containing mineral oil feed.

In accordance with the present invention the hydrotreating of the feedstock is conducted under hydrogenation conditions, generally a temperature of about 400 to 800° F., preferably about 500 to 750° F. The conditions may include a pressure of about 0 to 3000 pounds per square inch guage (p.s.i.g.), preferably about 100–2000 p.s.i.g.; a weight hourly space velocity of feed to catalyst of about 0.1 to 10 WHSV, preferably about 0.5 to 5 WHSV; and a molar ratio of molecular hydrogen to hydrocarbon of about 1 to 20, preferably about 1 to 10.

The following examples will serve to illustrate the superior hydrogenation and denitrogenation activities of the catalysts of this invention as compared with a cobalt-molybdena-alumina catalyst of the prior art.

Example I 96.9 g. of a commercially available $Al_2O_3$ powder (35 Angstrom boehmite by X-ray diffraction) was impregnated with a manganese nitrate solution prepared by dissolving 28.6 g. manganous carbonate in 35 ml. of 70% nitric acid, 3 ml. of 30% hydrogen peroxide and 30 ml. of deionized water. The impregnation material then was oven dried and calcined for 3 hours at 900° F. 50.0 g. of the resulting powder was impregnated with 12.0 g. of molybdic acid (85% $MoO_3$) dissolved in 10 ml. of 28% $NH_4OH$ and 17 ml. of deionized water. The product was then oven dried and calcined for 3 hours at 1050° F., and similarly impregnated with a $Co(NO_3)_2$ solution and calcined for 3 hours at 900° F. The finished catalyst contained 3.8% Co, 14% $MoO_3$, 23.8% $Mn_3O_4$ and the balance essentially $Al_2O_3$. This is designated as catalyst 2 in the table to follow.

Example II 340 g. of the $Al_2O_3$ of Example I was impregnated with 642 ml. of a solution containing 147 g. of molybdic acid (85% $MoO_3$) and 100 ml. of 28% $NH_4OH$ and made up to volume with deionized water. After equilibration, the solids were filtered off and 321 ml. of the impregnating solution were recovered. The solids were oven dried and calcined for 3 hours at 1050° F. This

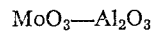

$MoO_3$—$Al_2O_3$ product was then impregnated with a solution of mixed colbalt and manganese nitrates, oven dried and calcined for 3 hours at 900° F. The catalyst composition is shown under catalyst 3 in the table.

Example III

Another Co—$MoO_3$—$Mn_3O_4$—$Al_2O_3$ catalyst was prepared by the method of Example II, resulting in the catalyst shown under 4 in the table.

Example IV

A third Co—$MoO_3$—$Mn_3O_4$—$Al_2O_3$ catalyst was prepared by the method of Example II resulting in catalyst 5, shown in the table.

These catalysts were tested as follows:

Into a 300 cc. autoclave was placed 3.0 g. of catalyst powder ( about 100 mesh). The catalyst was sulfided under 250 p.s.i.g. of $H_2S$ at 550° F. with stirring (1000 r.p.m.) for 10 minutes. After depressuring to 50 p.s.i g. $H_2S$ pressure, the bomb was then pressured up to 1000 p.s.i.g. with hydrogen, heated to 600° F., and 95 ml. of α methyl naphthalene containing 100 p.p.m. nitrogen, as quinoline, was added. A continual pressure of 1000 p.s.i.g. of hydrogen was maintained on the contents of the bomb at all times. As the reaction progressed, 1 ml. samples were removed at 30 minute intervals to follow the change in refractive index; when the product reached $n_D^{25}=1.5800$ (representing approximately 50% hydrogenation to the tetralin stage) the heat, hydrogen and stirring were shut off and the bomb cooled to room temperature. The bomb was dismantled and the hydrocarbon separated from the catalyst by filtration. Products were submitted for total nitrogen (p.p.m.) analysis to determine denitrogenation activity.

Using this test procedure, a commercial cobalt molybdate on alumina catalyst required 300 minutes to hydrogenate the α methyl naphthalene from $n_D^{25}=1.6134$ to 1.5800, a change of $1.11\times10^{-4}$ units RI per minute. After this treatment, the product contained 13 p.p.m. of nitrogen, thus 0.293 p.p.m. of nitrogen per minute was removed. By assigning values of 1.00 to both the hydrogenation and denitrogenation activities of the commercial catalyst a basis of comparison is set up by which the hydrogenation and denitrogenation activities of the catalysts of this invention can be related to those of the prior art catalyst. These comparisons appear in the following table.

| Catalyst Description | Activity | |
|---|---|---|
| | Hydrogenation | Denitrogenation |
| 1. 2.7% Co-14% MoO$_3$-Al$_2$O$_3$ (Commercial) | 1.00 | 1.00 |
| 2. 3.8% Co-14% MoO$_3$-23.8% Mn$_3$O$_4$-Al$_2$O$_3$ | 1.18 | 1.42 |
| 3. 2.7% Co-15% MoO$_3$-5.3% Mn$_3$O$_4$-Al$_2$O$_3$ | 1.47 | 1.69 |
| 4. 4.0% Co-16% MoO$_3$-6.0% Mn$_3$O$_4$-Al$_2$O$_3$ | 1.35 | 1.63 |
| 5. 3.0% Co-15% MoO$_3$-4.5% Mn$_3$O$_4$-Al$_2$O$_3$ | 1.54 | 1.75 |

As can be readily determined from the above table, each of the catalysts of this invention were improved in both hydrogenation and denitrogenation activities in comparison with the commercial catalyst. A plot of these data shows an activity maximum of the novel catalyst at a manganese oxide concentration of between 2.5 and 6.0 weight percent and a significant improvement over the whole range of compositions studied. Since the cost of manganese, in relation to that of alumina, is comparatively high, there is no apparent advantage in employing manganese in amounts greater than about 10%; nevertheless, the present invention contemplates its presence in the catalyst in amounts up to 30% or higher.

The catalyst of the present invention is useful for the removal of impurities and for the hydrogenation of unsaturated, i.e. olefinic, aromatic, etc., hydrocarbons in a wide range of petroleum, coal tar and shale oil fractions for the production of chemicals, lubricating oils and fuels. The catalyst of the present invention can be used for treating mineral hydrocarbon stocks comprising base stocks for lubricants, lighter petroleum distillates such as a gas oil for catalytic cracking and hydrocracking, wax distillates from paraffinic crudes, catalytically cracked distillates, coal tar distillates and the like. This catalyst is effective for the pretreatment of feedstocks for catalytic cracking including reduction in the concentration of sulfur, oxygen and nitrogen compounds, and of component which tend to produce excessive quantities of carbonaceous deposits in catalytic cracking, as well as the hydrogenation of such stocks to improve conversion and selectivity in catalytic cracking.

We claim:

1. A process for hydrotreating nitrogen-containing mineral hydrocarbons which comprises contacting said hydrocarbons with molecular hydrogen under hydrogenation conditions in the presence of a catalyst consisting essentially of minor amounts of cobalt, molybdenum and manganese on an alumina support.

2. The process of claim 1 wherein the hydrogenation conditions include a temperature of from about 400 to 800° F.

3. The process of claim 2 wherein the catalyst consists essentially of about 1 to 6% by weight of cobalt, calculated as metal, about 8 to 20% by weight of molybdenum, calculated as molybdenum trioxide, and about 1 to 30% by weight of manganese, calculated as manganese oxide, on an alumina support.

4. The process of claim 3 wherein the catalyst contains about 2 to 4% by weight of cobalt, about 12 to 15% by weight of molybdenum and about 2.5 to 6% by weight of manganese.

5. The process of claim 2 wherein the catalyst is sulfide prior to use in the hydrotreating.

References Cited
UNITED STATES PATENTS 3,260,682  7/1966  Calvin et al. _____ 252—465

SAMUEL P. JONES, *Primary Examiner.*